Mar. 20, 1923.

L. G. MOORE ET AL 1,448,974

FRONT OFFICE HOTEL LEDGER

Filed July 30 1920

2 sheets-sheet 1

Fig. 1

| ADULTS | CHILDREN | SERVANTS | ROOM No. | NAME | ROOMS | RESTAURANT | LAUNDRY | VALET | GROCERY STORE | BAGGAGE | GARAGE | NEWS | TELEGRAMS | LONG DISTANCE | TELEPHONE | TURK BATH |
|---|---|---|---|---|---|---|---|---|---|---|---|---|---|---|---|---|
| 100 | 4 | 3 | | BALANCE BROUGHT FORWARD | 425.00 | 375.50 | 31.00 | 15.00 | 24.00 | 3.40 | 37.50 | | 10.20 | 3.40 | 8.00 | 3 |
| | | | | M 266 | | | | | | | | | | | | |
| | | | 41 | 268 | | | | | | | | | | | | |
| 2 | | 1 | 574 | Smith, J.C. 270 | 10.00 | 1.75 / 4.30 / 5.10 | .78 | 1.50 | | | 3.00 | .40 | .54 | 2.5.5 / 5.5 / 5.5.5 | .25 | |
| 1 | | | | Jones, M.E. 272 | 5.00 | | 1.00 | | | | 1.50 | | | .50 | .15 | |
| 2 | | | | Roe, R. 274 | 8.00 | 4.50 / 1.70 | | | | | | .10 | 1.55 | | | |
| | | | | 276 | | | | | | | | | | | | |
| 1 | | | D | Doe, F. 278 | 5.00 | 1.00 | | | 1.00 | | | | | 5.5.5 / 5.5.5 / 5 / 5.5 | | |
| 2 | | | | Gault 280 | 8.00 | 5.00 / 3.50 | 1.64 | | | | 3.45 | .50 | .40 | | .35 | |
| 1 | | | D | Harriman 282 | 10.00 | 3.40 | | | 4.00 | | | | | | .10 | |
| | | | | 284 | | | | | | | | | | | | |
| | | | | 286 | | | | | | | | | | | | |
| | | | | 288 | | | | | | | | | | | | |
| | | | | 290 | | | | | | | | | | | | |
| | | | | 292 | | | | | | | | | | | | |
| | | | | ARRIVALS | | | | | | | | | | | | |
| 1 | | | 266 | Foster, C.A. | 5.00 | 2.00 | | | | 1.50 | | | | | | |
| 2 | | | 288 | Edwards, C.F. | 8.00 | 3.60 | | | | | 5.00 | | | 1.45 | .15 | |
| 1 | | | 278 | Adams, F.J. | 5.00 | | | | | | | | .43 | | | |
| 111 | 4 | 4 | | TOTAL | 474.00 | 411.35 | 33.42 | 17.50 | 24.00 | 9.90 | 50.45 | 1.00 | 13.12 | 5.35 | 9.00 | 3. |

Witness
Evans D. Haines.

Inventors
Lawrence G. Moore
and
George J. Sharshing.

By H. B. Willson & Co.
Attorneys

Mar. 20, 1923.  
L. G. MOORE ET AL  
1,448,974

FRONT OFFICE HOTEL LEDGER

Filed July 30 1920  2 sheets-sheet 2

FIG. 2

| | TURKISH BATHS | TAXI | DRUG STORE | | | DISBURSE- MENTS | DAILY TOTAL | BALANCE BROUGHT FORWARD | GRAND TOTAL | CASH | ALLOWANCES | CITY AND SUSPENSE | BALANCE TO BE CARRIED FORWARD | REMARKS |
|---|---|---|---|---|---|---|---|---|---|---|---|---|---|---|
| | 3.50 | 43.20 | 10.50 | | | 34.50 | 1024.70 | 5427.40 | 6452.10 | 1037.35 | 5.40 | | 5409.15 | |
| | | 4.20 | | | | | 31.82 | 445.95 | 477.77 | 200.00 | | | 277.77 | |
| | | | 1.45 | | Cash | 10.00 | 19.60 | 100.20 | 119.80 | | .25 | | 119.55 | |
| | | | | | | | 15.85 | 35.70 | 51.55 | | | | 51.55 | |
| | | | | | | | 2.00 | 43.25 | 45.25 | 45.25 | | | — | |
| | | | | | | | 22.84 | 174.35 | 197.19 | | | | 197.19 | |
| | | | | | | | 7.50 | 29.00 | 36.50 | | | 36.50 | — | |
| | | 1.00 | | | | | 9.50 | | 9.50 | | | | 9.50 | |
| | | | .25 | | | | 18.45 | | 18.45 | | | | 18.45 | |
| | | | | | | | 5.43 | | 5.43 | | | | 5.43 | |
| | 3.50 | 48.40 | 12.20 | | | 44.50 | 1157.69 | 6255.85 | 7413.54 | 1282.80 | 5.65 | 36.50 | 6088.59 | |

Witness  
Elvans D. Haines

Inventors  
Lawrence G. Moore  
and George J. Sharshing.

By H. B. Willson & Co.  
Attorneys

Patented Mar. 20, 1923.

1,448,974

UNITED STATES PATENT OFFICE.

LAWRENCE G. MOORE AND GEORGE J. SHARSHING, OF WASHINGTON, DISTRICT OF COLUMBIA.

FRONT-OFFICE HOTEL LEDGER.

Application filed July 30, 1920. Serial No. 400,030.

*To all whom it may concern:*

Be it known that we, LAWRENCE G. MOORE, a citizen of the United States, and GEORGE J. SHARSHING, a citizen of Austria, residing at Washington, in the District of Columbia, have invented certain new and useful Improvements in Front-Office Hotel Ledgers; and we do declare the following to be a full, clear, and exact description of the invention, such as will enable others skilled in the art to which it appertains to make and use the same.

This invention has general reference to bookkeeping systems for hotels and the like, but it relates particularly to daily ledger sheets which are used in connection with hotel bookkeeping systems.

The principal object of the invention is to provide a ledger sheet with columns and spaces so that an itemized list of the various data and charge accounts of the individual guests may be placed thereon so as to determine at a glance how the account of any particular guest stands, the arrangement also being such that the hotel management may determine at the end of the day when the daily sheets have been filled in, the daily earnings of the various departments of the hotel and also the totals of daily charges, cash payments and other information. The hotel management may check the returns from the various departments of the hotel with the totals shown in the daily sheets in order to discover possible errors and the exact trial balance of the ledger at the close of the day's business may be arrived at automatically, thus giving the net worth of ledger accounts.

With the above and other objects in view, the invention consists of the novel combination and arrangement of parts as are hereinafter fully described and claimed.

In the drawings forming a part of the application:

Figure 1 is a plan view of the left hand end portion of a ledger sheet constructed in accordance with this invention, and Figure 2 is a similar view of the right hand end portion of the sheet, said view forming a continuation of the portion shown in Figure 1.

In the drawings above described, the numeral 1 designates a sheet of paper, cardboard or any suitable material which may form one of the pages of a permanently bound ledger book, or which may be placed after having been filled out in a suitable loose-leaf binder. At the top of the sheet 1 there is provided a space upon which is printed or indicated in any suitable manner the name 2 of the hotel or other concern for which it is intended. This space also contains a place 3 upon which the date is indicated.

Extending from a portion adjacent the top of the sheet 1 and terminating at the bottom thereof and marked upon the sheet by printing or in any suitable manner are vertical lines 4. The lines 4 are parallel to one another and are spaced various distances apart to provide a plurality of vertical columns numbered consecutively from left to right from 5 to 35.

The upper extremities of the lines 4 abut a horizontal line 36, which extends across the sheet from one side edge to the other side edge thereof. Printed or otherwise indicated upon the sheet at a point spaced a short distance below the line 36 is a horizontal line 37, which forms the upper ends of the columns 5 to 35 into a plurality of spaces for containing appropriate headings 38. The heading of column 5 is "Adults", that of column 6 is "Children", column 7 "Servants" and column 8 "Room No.". The remaining columns 9 to 35 with the exception of columns 20, 25 and 26 contain consecutively the following headings:—"Name", "Rooms", "Restaurant", "Laundry", "Valet", "Grocery store", "Baggage", "Garage", "News", "Telegrams", "Long distance", "Telephone", "Turkish baths", "Taxi", "Drug store", "Disbursements", "Daily total", "Balance brought forward", "Grand total", "Cash", "Allowances", "City and suspense", "Balance to be carried forward", and "Remarks".

Arranged a short distance below the horizontal line 37 and extending across the sheet parallel to the latter is a line 39 whereby the portions of the columns immediately below the heading spaces are divided into spaces 40 for receiving the balances which are brought forward from the preceding sheet. In order to indicate what these spaces are for, the words "Balance brought forward" are placed in the space 40 arranged in column number 9.

Arranged in a vertical column upon the right hand side of column number 9 is a consecutive series of room numbers 41, and after the last number, column number 9 contains the word "Arrivals". In the case of a large hotel containing more rooms than could be listed upon a single sheet, obviously more than one sheet is necessary to list all of the room numbers. In this case only the last sheet contains the word "Arrivals".

At the bottom of the sheet 1 there is provided a pair of vertically spaced horizontal lines 42 and 43 which divide the lower portions or ends of the columns 5 to 35 into a horizontal row of spaces 44 adapted to contain the total of the columns.

The sheet 1 is further divided after every room by means of horizontal lines 45 so as to provide a line for the account of each guest.

The sheet 1 shown in the drawings has been filled out as in practice as representing the condition of accounts at the close of June 1st, 1920. The sheet represents the last of the ledger sheets of June 1, 1920, as will be seen because the spaces 40 are filled in with the balances brought forward from the preceding sheet.

After the close of the day when all of the charges have been entered against the individual guests and the ledger sheets have been filled in complete, the sheets for the next day are prepared. As an example the sheet of June 1, 1920, shown in the drawing will be considered. In column 9 the names of the occupants of the various rooms are placed opposite the room numbers, and the number of occupants is indicated by figures in columns 5, 6 and 7. The room charge is also indicated in column 10. This data is filled in in columns 5 to 10 when the sheets for a new day are first made out. As the day progresses and the various departments of the hotel send charges against the guests into the front main office, these charges are indicated in the proper columns against the particular guests. At the end of the day when all charges for the day have been sent in to the front office by the various departments, the columns 28 to 35 are filled in, the amounts depending upon the charges which are entered in columns 10 to 26. It will be understood that the charges for the individual local telephone calls are indicated individually in column 20, it being divided into small squares, into which are placed the charges for the individual calls, while the total charges for the local calls are extended and indicated in column 21. Columns 25 and 26 are to be used for the purpose of noting any charges against the guests which cannot be included in the charges listed in columns 10 to 24. The column number 33 is to be used when a particular guest has departed from the hotel so that his room is not to be held for him any longer, and he has not paid his bill so that his bill is to be placed on a standing account. In such a case, the charge entered against this particular guest should not be placed upon the next day's sheet.

To explain matters more in detail, the case of M. E. Jones will be considered. By referring to the sheet it will be seen that M. E. Jones occupies room No. 272 and is responsible for one adult. The charge of the room entered against him is $5.00. On June 1st, no restaurant or laundry charges are entered against him, but a charge of $1.00 for valet services, $1.50 for garage services, $.50 for a long distance phone call, $.15 for three local phone calls, $1.45 for drug store charges, and $10.00 for cash paid out by the hotel for him have been entered against his account. The total charges for the day as indicated in column number 28 is $19.60. The column 29 indicates that the balance of the charges against M. E. Jones brought forward from the preceding day was $100.20 so that the grand total as indicated in column 30 is $119.80. Column 32 shows that an allowance or deduction of $.25 was allowed him so that the balance to be carried forward as shown in column 34 to the next day's sheet amounts to $119.55. In the case of F. Doe, he departed and settled his account before the close of the day so that room No. 278 could be occupied by some new arrival, the charge of $5.00 indicated in column 10 for room 278 has been struck out and the figure in column number 5 has also been struck out so that these amounts would not be included when determining the totals of columns 5 and 10 at the end of the day.

As the guests arrive at the hotel and they are assigned to rooms, their names are placed upon the ledger sheet beneath the above mentioned word "Arrivals." The numbers of the rooms to which these new arrivals are assigned are indicated in column number 8. In the case of F. J. Adams it will be seen that he is assigned to room 278 which was previously occupied by F. Doe who departed before the end of the day. It will thus be readily understood that it is preferable to place the names of the new arrivals at the end of the sheet rather than opposite the printed numbers of the rooms to which they are assigned.

After all of the charges have been entered against all of the individual guests, and the columns 28 to 34 have been filled in with the proper amounts, the totals of all of the columns are determined and filled in the spaces 44. It will thus be seen that the ledger sheet will show the total number of guests at the hotel at the end of a particular day, the earnings of the various departments of the hotel, the daily total charges, the total balance brought forward, the grand total, the cash paid on account, the total allowances, the total amount placed on a standing account, and the total charges to be carried forward to the next day's account. With the totals in the spaces 44, the hotel management can use these figures as a check upon the daily returns from the various departments of the hotel and any error in such daily returns can be readily discovered.

What is claimed is:

A daily ledger sheet for hotel bookkeeping systems having the room numbers of the hotel marked thereon and arranged in a vertical column, the sheet being divided into horizontally extending sections opposite the room numbers for containing the charge accounts of the room occupants and data respecting the latter, the sheet being also provided with a plurality of vertical columns headed to represent the various departments of the hotel from which charges against the room occupants originate and to represent the debits, credits, totals and other data respecting the latter, the sheet being further provided at the bottom with a horizontally extending section adapted to contain the totals of the columns, the whole sheet adapted when filled in to show the exact condition of the room occupants' individual accounts and an exact statement of income on charges originating in the various departments of the hotel so that a correct trial balance may be formed.

In testimony whereof we have hereunto set our hands.

LAWRENCE G. MOORE.
GEORGE J. SHARSHING.